(12) United States Patent
Honorato Ruiz et al.

(10) Patent No.: US 11,643,222 B2
(45) Date of Patent: May 9, 2023

(54) METHOD FOR MANUFACTURING THE TRAILING EDGE RIBS AND THE BEARING RIBS OF TRAILING EDGES OF AIRCRAFT LIFTING SURFACES

(71) Applicant: Airbus Operations, S.L., Getafe (ES)

(72) Inventors: Francisco Javier Honorato Ruiz, Getafe (ES); Jesús Javier Vázquez Castro, Getafe (ES); Enrique Guinaldo Fernández, Getafe (ES); Carlos García Nieto, Getafe (ES); Iker Vélez De Mendizábal Alonso, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 671 days.

(21) Appl. No.: 16/502,436

(22) Filed: Jul. 3, 2019

(65) Prior Publication Data

US 2020/0010218 A1 Jan. 9, 2020

(30) Foreign Application Priority Data

Jul. 6, 2018 (EP) ..................................... 18382506

(51) Int. Cl.
*B64F 5/10* (2017.01)
*B64C 3/18* (2006.01)
*B29L 31/30* (2006.01)
*B64C 9/02* (2006.01)

(52) U.S. Cl.
CPC ................ *B64F 5/10* (2017.01); *B64C 3/187* (2013.01); *B29L 2031/3085* (2013.01); *B64C 9/02* (2013.01)

(58) Field of Classification Search
None
See application file for complete search history.

(56) References Cited

U.S. PATENT DOCUMENTS

| 2,014,801 | A | 9/1935 | Flader |
| 9,381,991 | B2 | 7/2016 | Guinaldo Fernandez et al. |
| 9,387,922 | B2 | 7/2016 | Guinaldo Fernandez et al. |
| 9,522,504 | B2 | 12/2016 | Garcia Martin et al. |

(Continued)

FOREIGN PATENT DOCUMENTS

| EP | 2735504 A1 | 5/2014 |
| EP | 2738086 A1 | 6/2014 |

(Continued)

OTHER PUBLICATIONS

European Search Report; priority document.

*Primary Examiner* — Barbara J Musser
(74) *Attorney, Agent, or Firm* — Greer, Burns & Crain, Ltd.

(57) ABSTRACT

A method for manufacturing the trailing edge ribs and the bearing ribs of trailing edges of aircraft lifting surfaces, in which the trailing edge ribs and the bearing ribs are made by joining simple C-shaped parts and/or simple L-shaped parts so as to obtain the final trailing edge ribs and bearing ribs. The manufacturing of the simple C-shaped parts uses the same tooling both for the trailing edge ribs and the bearing ribs, and the manufacturing of the simple L-shaped parts uses the same tooling both for the trailing edge ribs and the bearing ribs.

1 Claim, 4 Drawing Sheets

(56) References Cited

U.S. PATENT DOCUMENTS

| | | | |
|---|---|---|---|
| 2008/0245928 A1* | 10/2008 | Kulesha | B64C 3/18 |
| | | | 244/123.1 |
| 2009/0127406 A1* | 5/2009 | McDonald | B64C 9/02 |
| | | | 244/90 R |
| 2009/0218450 A1 | 9/2009 | McAlinden et al. | |
| 2010/0044511 A1 | 2/2010 | Coulter et al. | |
| 2015/0083861 A1* | 3/2015 | Alby | B64C 1/06 |
| | | | 244/119 |
| 2015/0144737 A1* | 5/2015 | Garcia Martin | B29C 70/30 |
| | | | 244/123.14 |
| 2018/0304503 A1* | 10/2018 | Steinacher | B29C 43/34 |

FOREIGN PATENT DOCUMENTS

| | | | |
|---|---|---|---|
| EP | 2878435 | A1 | 6/2015 |
| FR | 2946009 | A1 | 12/2010 |

\* cited by examiner

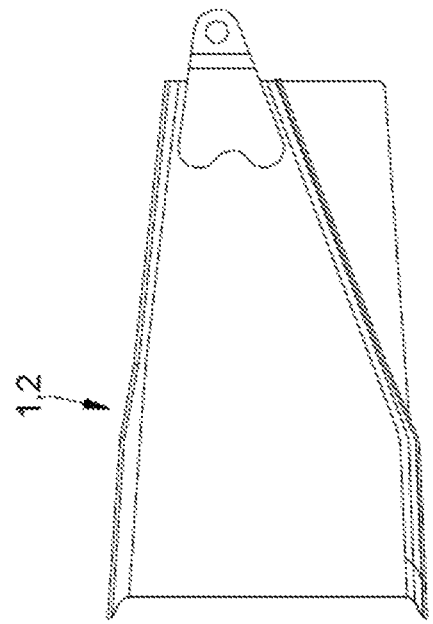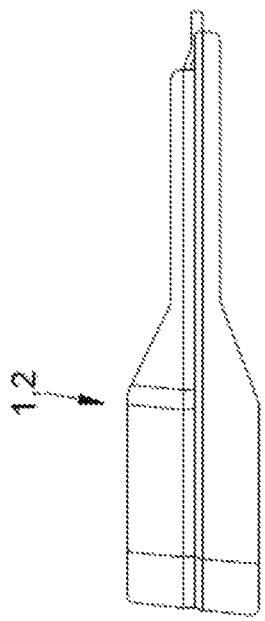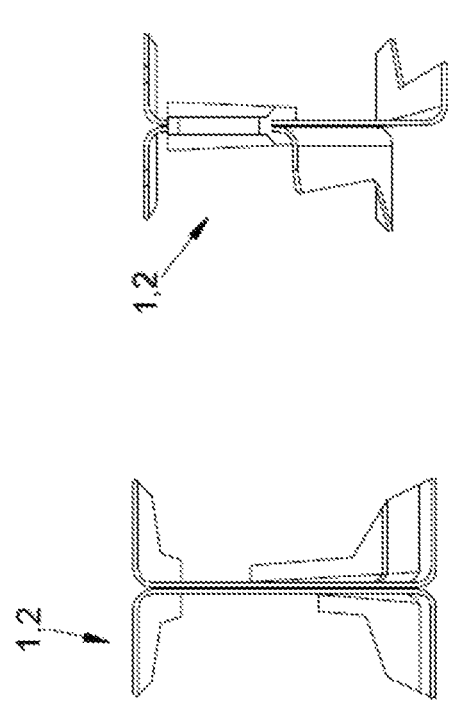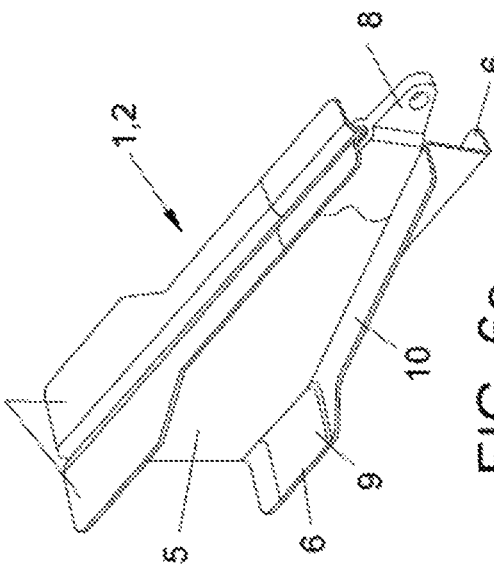

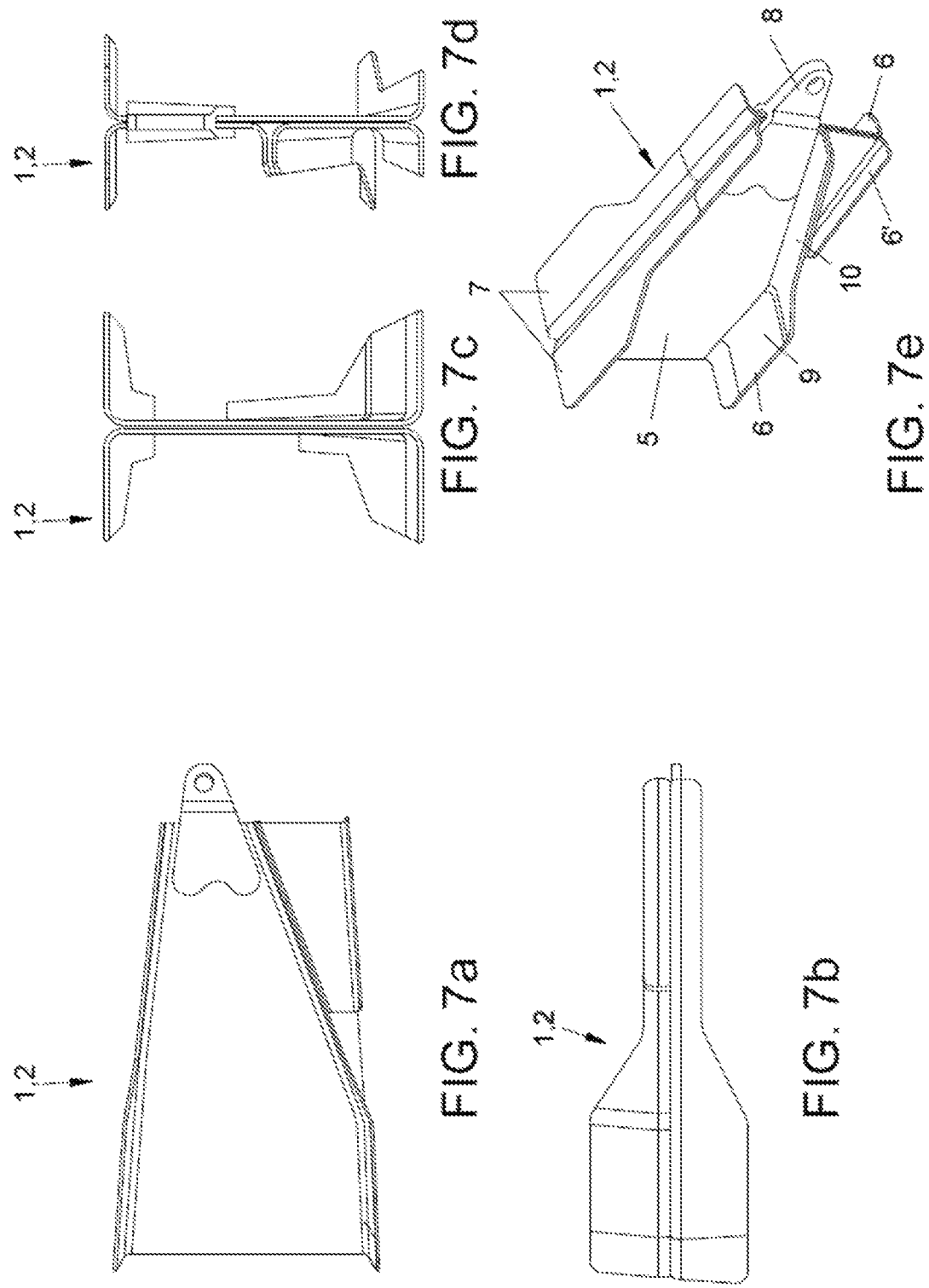

METHOD FOR MANUFACTURING THE TRAILING EDGE RIBS AND THE BEARING RIBS OF TRAILING EDGES OF AIRCRAFT LIFTING SURFACES

CROSS-REFERENCES TO RELATED APPLICATIONS

This application claims the benefit of the European patent application No. 18382506.6 filed on Jul. 6, 2018, the entire disclosures of which are incorporated herein by way of reference.

FIELD OF THE INVENTION

This invention refers to a method for manufacturing the trailing edge ribs and the bearing ribs of trailing edges of aircraft lifting surfaces, which uses a modular manufacturing concept.

BACKGROUND OF THE INVENTION

An aircraft lifting surface, such as a wing, a Horizontal Tail Plane (HTP) or a Vertical Tail Plane (VTP), usually comprises torsion boxes as main supporting structures, leading edges and trailing edges with control surfaces (flaps, ailerons, elevators, rudders, etc.). An example of a known prior art HTP can be seen in FIG. 2.

The trailing edge of an aircraft lifting surface is a key element, as it is the transition between the torsion box and the control surfaces.

Trailing edges usually comprise an upper cover (placed on the upper side of the aircraft lifting surface) and a lower cover (placed on the lower side of the aircraft lifting surface), both of them formed by a set of panels.

The set of panels corresponding to the lower cover—or at least part of this set of panels—is usually connected by means of hinges to the aircraft lifting surface, so the panels which make up the lower cover can be opened to gain access for maintenance tasks of elements such as systems, actuators, fittings, etc.

Standard architecture for trailing edges comprises the two sets of panels already mentioned and a set of ribs, extending between the upper cover and the lower cover, which are connected to the torsion box at coincident points with the torsion box ribs (for multirib torsion boxes), although the number of ribs placed in the trailing edge is significantly lower.

These ribs can be of two kinds, so called Bearing Ribs (BR) and Trailing Edge Ribs (TER). Bearing ribs (also known as hinge arms) hold the hinge line of the control surface, while trailing edge ribs are used to provide stability to the trailing edge structure.

Some prior art documents disclose aircraft lifting surfaces with trailing edges comprising ribs.

EP 2738086 A1 provides an aircraft lifting surface with a main supporting structure comprising upper and lower faces defining its aerodynamic profile, front and rear faces oriented towards, respectively, the leading and trailing edges, a first set of transverse ribs extended from the front face to the rear face and a second set of transverse ribs crossing the front face and/or the rear face. The integration of leading and trailing edge ribs in the main supporting structure allows weight and cost reduction of aircraft lifting surfaces in this invention. This invention also provides a manufacturing method of said main supporting structure.

EP 2735504 A1 provides an aircraft lifting surface with a monolithic main supporting structure of a composite material comprising an upper skin including at least a part of the upper aerodynamic profile of the leading edge and/or of the trailing edge, a lower skin, a front spar, a rear spar, a plurality of leading edge ribs and/or a plurality of trailing edge ribs. This invention also provides a manufacturing method of said monolithic main supporting structure.

EP 2878435 A1 refers to an integrated composite trailing edge and to its method of manufacturing. The trailing edge comprises an integrated main structure comprising: an upper cover, lower flanges, and a set of ribs extending between the upper cover and the lower flanges, and a set of sandwich type lower panels attachable to the lower flanges of the integrated main structure. The method comprises the steps of providing a set of prepreg laminated preforms over a set of tool modules having a hollow so that each laminated configures a double C-shaped laminated preform having an upper section with a recess, two primary and secondary flanges, the upper section partly forming the upper cover, the two primary flanges partly forming the ribs and the two secondary flanges forming the lower flanges.

The trailing edge ribs (TERs) and the bearing ribs (BRs) used in HTPs and VTPs are usually different in their shapes (i.e., the shapes of the TERs are different from the shapes of the BRs). For instance, in the aircraft Airbus A320 there are 9 TERs and 6 BRs in each side of the HTP, the BRs having a different shape from that of the TERs The trailing edge ribs (TERs) and the bearing ribs (BRs) in HTPs and VTPs are also usually different between components (i.e., TERs in HTPs present a different configuration from TERs in VTPs, for example), as the magnitude of the loads supported and the design space are also different.

When designing the empennage of an aircraft, one of the key top level requirements in terms of potential cost savings is the commonality. Accordingly, it is desirable to obtain an empennage with improved commonality in its components.

SUMMARY OF THE INVENTION

Accordingly, an object of the present invention is to provide a method for manufacturing the trailing edge ribs and the bearing ribs of trailing edges of aircraft lifting surfaces that solves the above mentioned drawbacks, increasing commonality.

The invention provides a method for manufacturing the trailing edge ribs and the bearing ribs of trailing edges of aircraft lifting surfaces, in which the trailing edge ribs and the bearing ribs are made by joining simple C-shaped parts and/or simple L-shaped parts so as to obtain the final trailing edge ribs and bearing ribs, such that the manufacturing of the simple C-shaped parts uses the same tooling both for the trailing edge ribs and the bearing ribs, and the manufacturing of the simple L-shaped parts uses the same tooling both for the trailing edge ribs and the bearing ribs.

The invention provides several advantages with respect to the prior art:

It allows one single tooling for manufacturing all the ribs of a trailing edge (regardless of whether they are bearing edge ribs or trailing edge ribs) for both HTP and VTP.

It allows a significant cost reduction derived from the use of a common rib concept for both HTP and VTP.

It provides advantages for those departments dealing with operability and service operations, based on having one similar approach for the bearing ribs and trailing edge ribs for HTP/VTP.

It presents the concept of one versatile kind of rib for trailing edges that fulfills both structural functions (BR: attaching elevator hinge line; TER: supporting trailing edge panel).

Other characteristics and advantages of the present invention will be clear from the following detailed description of several embodiments illustrative of its object in relation to the attached figures.

BRIEF DESCRIPTION OF THE DRAWINGS

FIGS. 6a to 6e show several views of a configuration of a preform for TERs/BRs of a trailing edge of the invention.

FIGS. 7a to 7e show several views of a configuration of another preform for TERs/BRs of a trailing edge of the invention.

DETAILED DESCRIPTION OF THE PREFERRED EMBODIMENTS

Figure 1:
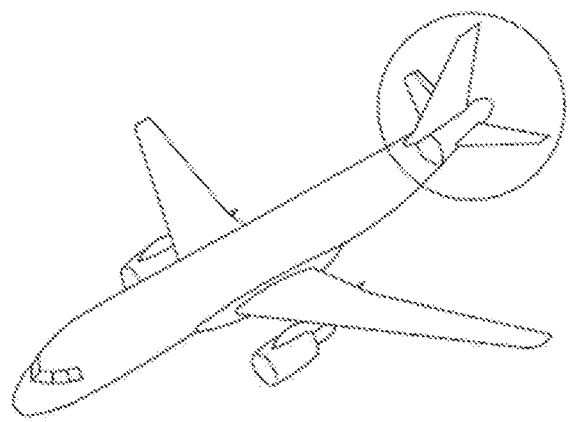
FIG. 1 is a perspective view of an aircraft with its fuselage.
Figure 2:
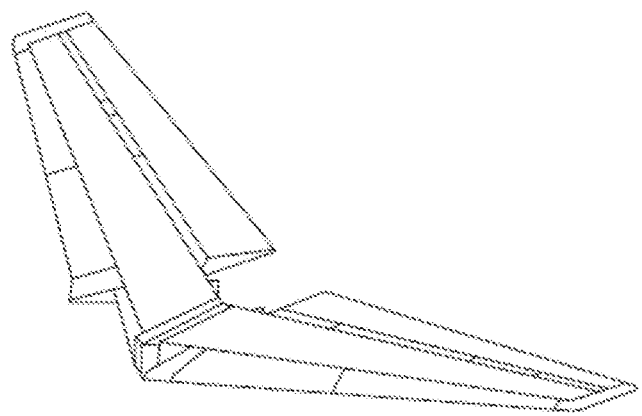
FIG. 2 is a view of a known prior art HTP.
Figure 3:
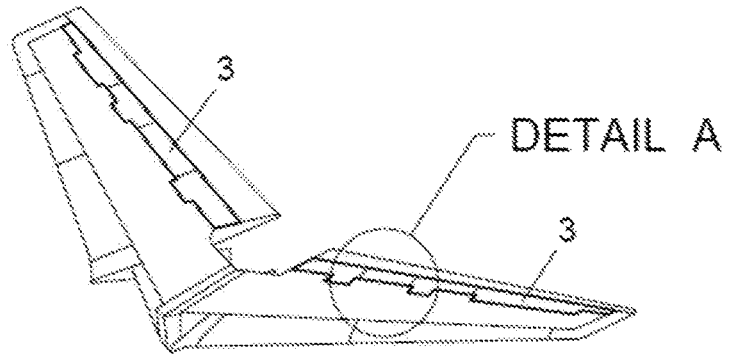
FIG. 3 is a view of the general overview of a trailing edge of an HTP.
Figure 4:
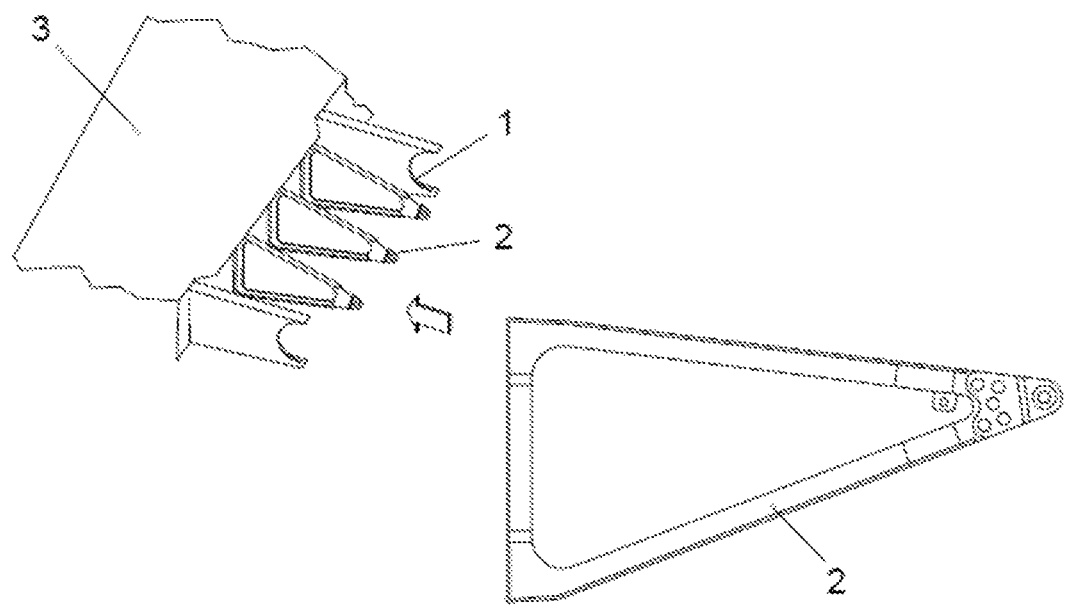
FIG. 4 is a view of a prior art trailing edge showing the trailing edge ribs (TERs) and the bearing ribs (BRs).

FIG. 1 shows an aircraft with its aircraft fuselage and the empennage which may embody the present invention. FIG. 2 shows a prior art horizontal tail plane of an aircraft showing the torsion boxes, the leading edges and the trailing edges with control surfaces. FIG. 3 is a general overview of a trailing edge 3 of an HTP; as it can be seen, the trailing edge 3 is the transition between the torsion box and the control surfaces. FIG. 4 is a detail of FIG. 3 (Detail A) showing a view of a portion of a prior art trailing edge 3 showing several trailing edge ribs (TERs) 1 and bearing ribs (BRs) 2 with different configurations.

Figure 5:
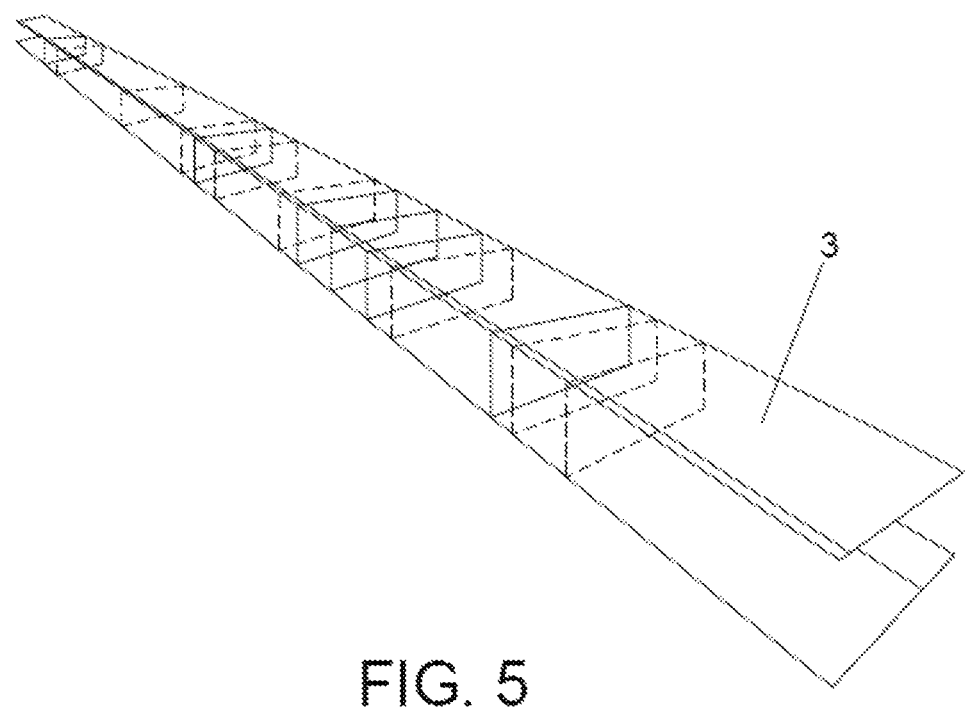
FIG. 5 is a schematic view of a trailing edge of the invention showing the positions for the trailing edge ribs (TERs) and the bearing ribs (BERs).

FIG. 5 is a schematic view of a trailing edge 3 showing the positions for the trailing edge ribs (TERs) 1 and the bearing edge ribs (BRs) 2, manufactured according to the method of the invention.

FIGS. 6a to 6e and 7a to 7e show two configurations of TERs/BRs 1, 2 of a trailing edge 3, manufactured according to the method of the invention.

In the method for manufacturing the TERs 1 and the BRs 2 of trailing edges 3 of aircraft lifting surfaces of the invention, the TERs 1 and the BRs 2 are made by joining simple C-shaped parts and/or simple L-shaped parts so as to obtain the final TERs 1 and BRs 2. The manufacturing of the simple C-shaped parts uses the same tooling both for the TERs 1 and the BRs 2, and the manufacturing of the simple L-shaped parts uses the same tooling both for the TERs 1 and the BRs 2.

Both BRs 2 and TERs 1 are manufactured by joining parts with C-shape or L-shape. Accordingly, the invention comprises the manufacturing of those parts for all BRs 2 and TERs 1 using the same tooling, such that then they are joined to get a final part (BR 2 or TER 1) with the specific size and geometry needed.

The bearing ribs 2 hold the hinge line attached to the rear spars of the torsion box, while the trailing edge ribs 1 provide stability to the structure of the trailing edge 3.

The bearing ribs 2 and the trailing edge ribs 1 can have an "I" profile, comprising a central web 5, lower and upper flanges 6, 7 and a front projection 8.

The width of the upper flanges 7 and the lower flanges 6 of the bearing ribs 2 and the trailing edge ribs 1 can be greater in the back than in the front, and one of the lower flanges 6 can comprise a straight back section 9 and an inclined section 10 ascending toward the front.

The bearing ribs 2 and the trailing edge ribs 1 additionally may comprise a lower flange 6' placed under the inclined section 10 of the lower flange 6 that comprises a straight back section 9 and an inclined section 10 ascending toward the front (FIGS. 7a to 7e).

All the bearing ribs 2 and the trailing edge ribs 1 can be made of the same material.

Materials used can be metal or any CFRP with thermoset or thermoplastic resin. Depending on the material selected, the joining technology could be one or more of the following: fastening, bonding, secondary bonding or thermoplastic welding.

The preferred material is thermoplastic resin reinforced with continuous carbon fiber. This allows the following:
   forming in a modular tool the parts to be joined
   welding in between parts to form final BR 2 or TER 1
   thermoplastics does not need an autoclave
   thermoplastics are recyclable.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing stability trailing edge ribs and bearing ribs of trailing edges of aircraft lifting surfaces with control surfaces, the bearing ribs configured to hold a hinge line of a control surface, comprising the steps:
   making the stability trailing edge ribs and the bearing ribs by joining C-shaped cross-section parts and/or L-shaped cross-section parts so as to obtain the final stability trailing edge ribs and the bearing ribs,
   manufacturing the C-shaped cross-section parts using the same tooling both for the stability trailing edge ribs and the bearing ribs, and/or
   manufacturing the L-shaped cross-section parts using the same tooling both for the stability trailing edge ribs and the bearing ribs, wherein the joining of C-shaped cross-section parts and/or L-shaped cross-section parts results in an I-shaped cross-section profile for the final stability trailing edge ribs and bearing ribs, comprising a central web, lower and upper flanges and a rear projection, wherein the joining of C-shaped cross-section parts and/or L-shaped cross-section parts results in final stability trailing edge ribs and bearing ribs in which the width of the upper flanges and the lower flanges is greater in the front than in the rear, wherein all the bearing ribs and the stability trailing edge ribs are made of the same material, wherein the material is thermoplastic resin reinforced with continuous carbon fiber, and the C-shaped cross-section parts and/or the L-shaped cross-section parts are joined by welding, wherein the joining of C-shaped cross-section parts and/or L-shaped cross-section parts results in final stability trailing edge ribs and bearing ribs in which a first lower flange of the lower flanges comprises a straight front section and an inclined section ascending toward the rear, and wherein the joining of C-shaped cross-section parts and/or L-shaped cross-section parts results in final stability trailing edge ribs and bearing ribs which additionally comprise a second lower flange of the lower flanges placed under the inclined section of the first lower flange that comprises a straight front section and an inclined section ascending toward the rear.

* * * * *